Figure 3:
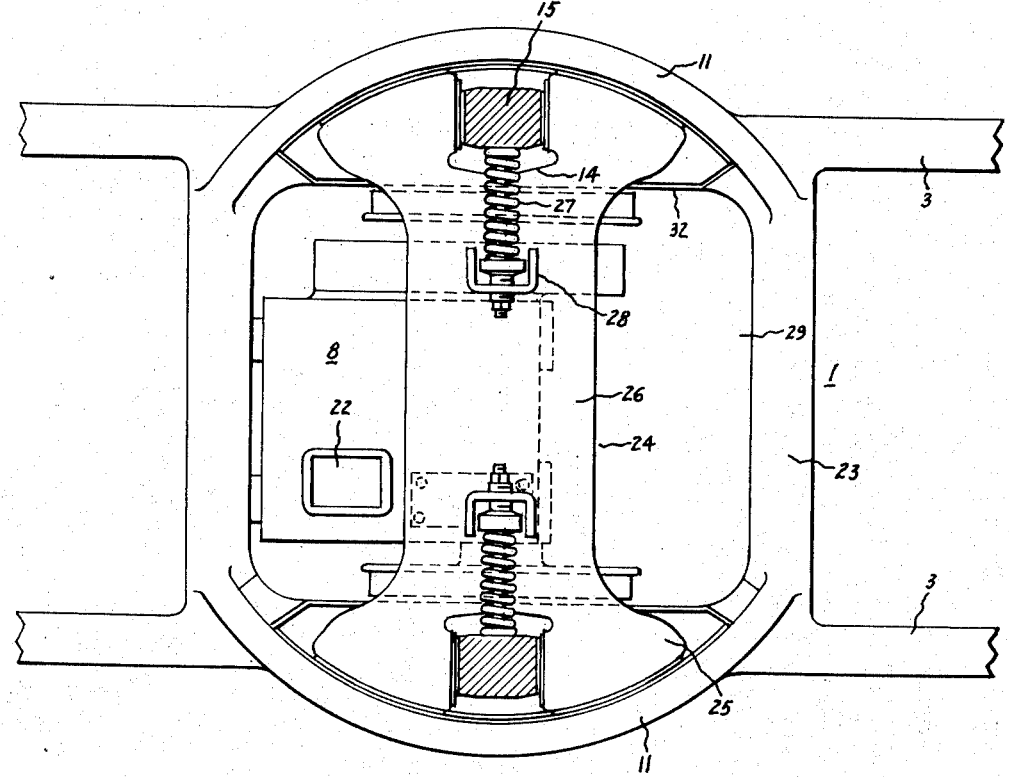

Sept. 1, 1953  B. S. CAIN ET AL  2,650,549
RAIL VEHICLE TRUCK
Filed June 17, 1950  3 Sheets-Sheet 1
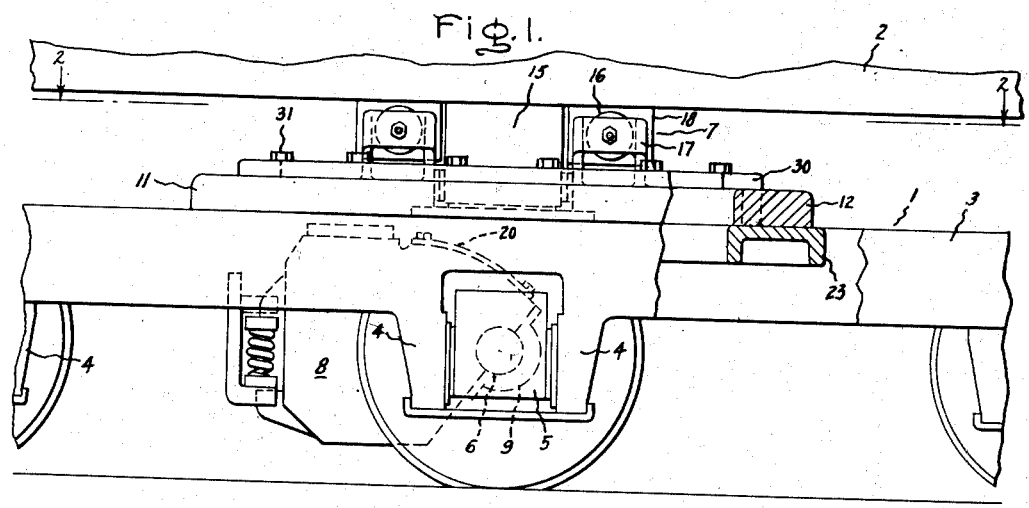
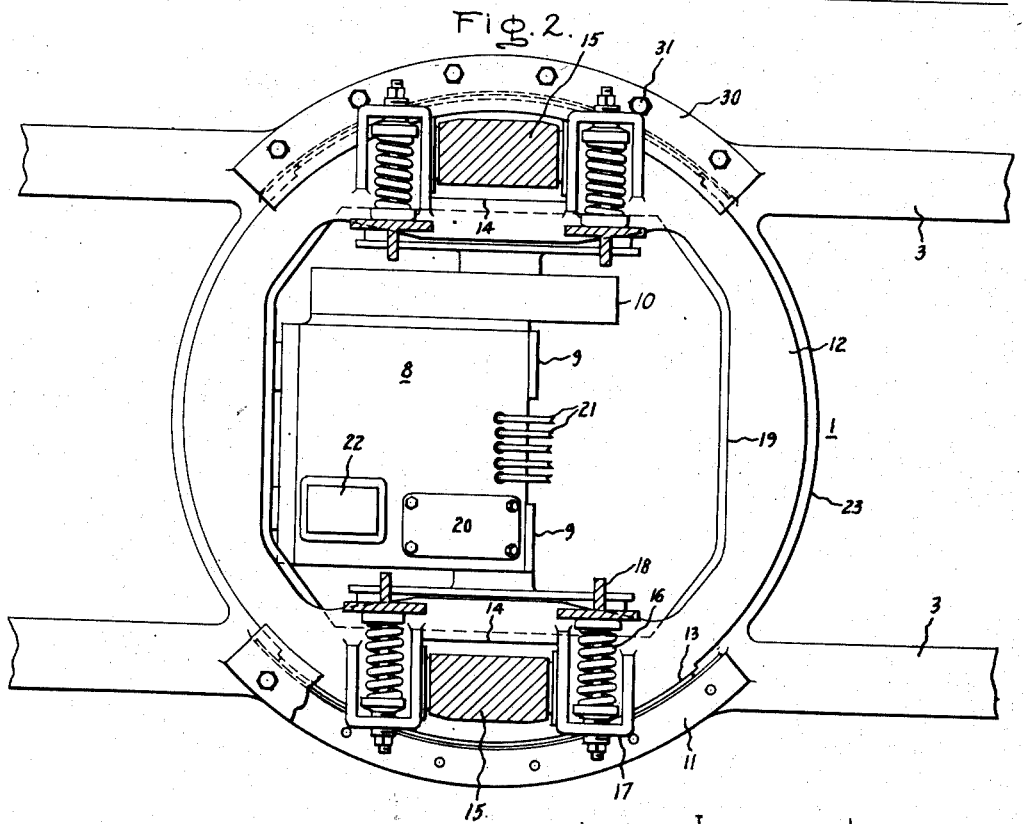
Inventors:
Basil S. Cain,
John K. Erzer,
by *Ernest C. Britton*
Their Attorney.

Inventors:
Basil S. Cain,
John K. Erzer,
by Ernest H. Britton
Their Attorney.

Patented Sept. 1, 1953

2,650,549

UNITED STATES PATENT OFFICE 2,650,549

RAIL VEHICLE TRUCK

Basil S. Cain and John K. Erzer, Erie, Pa., assignors to General Electric Company, a corporation of New York Application June 17, 1950, Serial No. 168,676

18 Claims. (Cl. 105—133)

This invention relates to trucks for rail vehicles and more particularly to center bearings for trucks having lateral displacement with respect to the body of the vehicle.

Laterally displaceable trucks are frequently utilized for rail vehicles in order to allow for lateral displacement of the truck with respect to the body of the vehicle in addition to the usual relative rotation of the truck with respect to the body provided by the center bearing. In the design of laterally displaceable trucks, particularly three axle trucks having all axles motorized, it is desirable to include a center bearing structure which will provide sufficient space for a traction motor on the middle axle and which will also provide accessibility to the motor from above for inspection and maintenance. In such a construction, it is also desirable to provide for carrying the weight of the vehicle body directly on the side frames of the truck rather than through a conventional bolster.

An object of this invention is to provide an improved rail vehicle truck having lateral displacement with respect to the body of the vehicle.

Another object of this invention is to provide an improved laterally displaceable rail vehicle truck having a motorized axle under the center bearing.

A further object of this invention is to provide an improved center bearing construction for a rail vehicle truck wherein access is provided to a traction motor driving an axle positioned under the center bearing.

A still further object of this invention is to provide an improved laterally displaceable truck having a center bearing construction permitting access to a traction motor driving an axle positioned below the center bearing.

Yet another object of this invention is to provide an improved laterally displaceable truck wherein the weight of the body is carried on the truck side frames.

Further objects and advantages of this invention will become apparent and the invention will be better understood from the following description referring to the accompanying drawings, and the features of novelty which characterize this invention will be pointed out with particularity in the claims annexed to and forming a part of this specification.

In accordance with one aspect of this invention, there is provided a truck having a pair of side frames, each of the side frames having an arcuate bearing portion formed on its upper surface. A center plate member is provided having arcuate portions respectively arranged in sliding engagement with the side frame bearing portions thus forming a center bearing for permitting rotation of the truck relative to the body of the vehicle. The center plate member is provided with a pair of openings formed therein respectively arranged over the side frames and a pair of sliding bearing members which are secured to the vehicle body extend through the guiding openings. These bearing members slidingly bear on the side frames of the truck for carrying the weight of the body. The bearing members are adapted to slide laterally in the guiding openings of the center plate member for permitting lateral displacement of the truck with respect to the body and resilient means are provided for restraining this lateral movement of the truck. In one form of this invention, an opening is provided in the center of the center plate member which permits access to a traction motor driving an axle positioned under the center plate member. In accordance with a further aspect of this invention, the bearing members secured to the vehicle body rest on the center plate member. Thus, the weight of the body is transmitted to the truck side frames through the center plate member. Lateral sliding of the bearing members is provided for by guiding slots formed in the center plate member. In all forms of this invention, oil dams are provided for retaining oil on the sliding surfaces.

Figure 4:
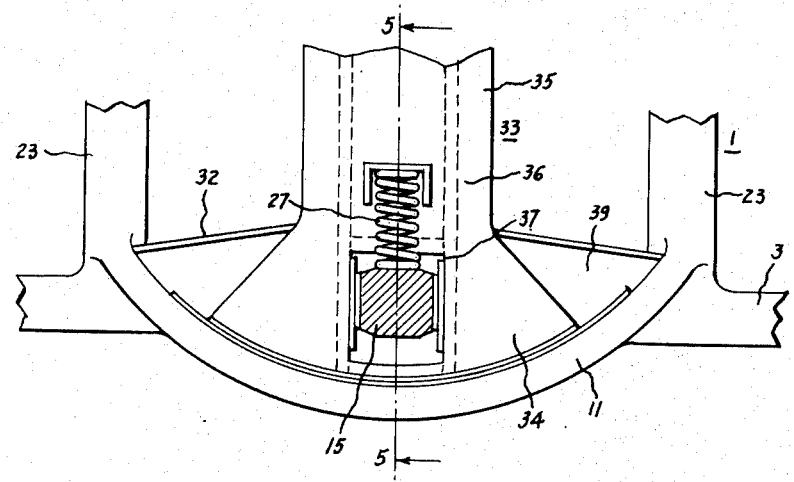
Figure 5:
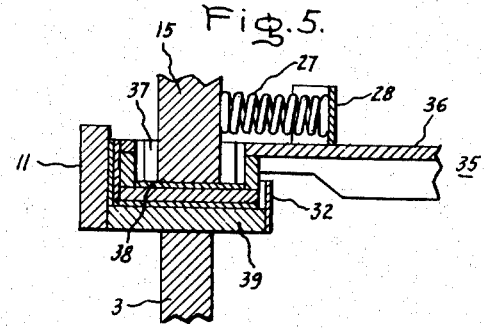

In the drawing, Fig. 1 is a side elevational view, partly in section, illustrating one form of the improved laterally displaceable truck construction of this invention; Fig. 2 is a plan view, partly in section, taken along the line 2—2 of Fig. 1; Fig. 3 is a plan view showing a modification of the improved truck construction of this invention; Fig. 4 is a partial plan view showing a further modification; and Fig. 5 is a cross sectional view taken along the line 5—5 of Fig. 4.

Referring now to Figs. 1 and 2, there is shown a rail vehicle truck, generally identified as 1 which supports the body 2 of the vehicle. The truck 1 is provided with side frames 3 having pedestal jaws 4 which guide journal boxes 5 in the conventional manner. In the embodiment shown in Figs. 1 and 2, a 3-axle truck is provided having a middle axle 6 arranged under the center bearing assembly 7, as will be hereinafter described. A traction motor 8 is provided supported by the axle 6 by means of axle bearings 9. The traction motor 8 drives the axle 6 through suitable gearing encased in a gear casing 10.

In order to provide a center bearing construction which will permit access to the motor 8 and which will also provide for lateral displacement of the truck 1 with respect to the body 2, the arrangement now to be described is provided. The side frames 3 of the truck 1 are provided with arcuate bearing portions 11 on their upper surfaces, the bearing portions 11 having a common radius taken along the center line of the truck 1. A center plate member 12 is provided having arcuate portions 13 arranged in sliding engagement with the arcuate bearing portions 11 of the side frames 3. The center plate member 12 thus forms with the arcuate bearing portions 11, a centerless center bearing for the truck 1 permitting the relative rotation of the truck with respect to the body 2, as will be hereinafter described. In order to provide for carrying the weight of the body 2, the center plate member 12 has a pair of transverse guiding openings 14 formed therein and a pair of sliding bearing members 15 are secured to the body 2 and extend through the transverse openings 14 in the center plate member 12 to slidingly bear on bearing pads mounted on the upper surfaces of the side frames 3. Thus, the weight of the body 2 is carried by the side frames 3 through the sliding bearing members 15. The sliding bearing members 15 are adapted to slide laterally in the openings 14 in the center plate member 12 thus permitting lateral displacement of the truck 1 with respect to the body 2 while preventing relative rotation of the center plate member 12 with respect to the body. In order to restrain the lateral displacement of the truck 1 with respect to the body 2, spring assemblies 16 are provided. These springs have one end engaging a bracket 17 secured to the center plate member 12 and the other end engaging a bracket 18 secured to the body 2.

In order to permit access to the traction motor 8, the center plate member 12 is provided with a central opening 19 formed therein. Thus, the inspection cover 20 is readily accessible for inspection and maintenance of the commutator, ample room is provided for leads 21, and space is provided for a suitable duct for blowing ventilating air into the motor through opening 22. Transoms 23 may be provided connecting the side frames 3 on either side of the arcuate bearing portions 11 in order to strengthen the structure. Retaining members 30 are secured to the arcuate bearing portions 11 in any suitable manner, as by bolts 31, and serve to hold the center plate member 12 in place. It will be readily apparent that the center plate 12 can be retained in its proper position by any other suitable means, such as spring loading from the body or the truck frame.

Referring now to Fig. 3, in which like parts are indicated by like reference numerals, each of the side frames 3 of the truck 1 is provided with an arcuate bearing portion 11 and transom members 23 connect the side frames 3 on either side of the arcuate bearing portions. A center plate member 24 is provided having arcuate portions 25 at its ends slidingly engaging the arcuate bearing portions 11 of the side frames 3. A center portion 26 serves to connect the arcuate portions 25 of the center plate member 24. Transverse grooves 14 are formed in the center plate member 24 and sliding bearing members 15 are secured to the body of the vehicle and extend through the openings 14 to slidingly bear on the side frames 3. The sliding bearing members 15 restrain relative rotation of the center plate member 24 with respect to the body and thus the arcuate portions 25 of the center plate member 24 co-operating with the arcuate bearing portions 11 of the truck 1 form a centerless center bearing for the truck providing for its relative rotation with respect to the body. The sliding bearing members 15 may, however, slide laterally in the openings 15 to provide for lateral displacement of truck 1 with respect to the body. In order to restrain this lateral movement, a pair of springs 27 are provided, each having one end engaging a bracket 28 on the center plate member 24 and its other end engaging the sliding bearing member 15. Access is provided to the traction motor 8 which drives the axle under the center plate member 24, through the space 29 between the middle portion 26 of the center plate member 24 and the transom members 23. Retaining members of the type shown at 30 in Figs. 1 and 2 may be utilized to hold the center plate member 24 in place. Oil dams 32 are provided to retain oil on the sliding surfaces of the arcuate portions 25 and the bearing members 15.

Referring now to Figs. 4 and 5, in which like parts are again indicated by like reference numerals, each of the side frames 3 of the truck 1 is provided with an arcuate bearing portion 11 with transom members 23 serving to connect the side frames 3 on either side of the arcuate bearing portions. A center plate 33 is provided having arcuate portions 34 at its ends slidingly engaging the arcuate bearing portions 11 of the side frames 3. A center portion 35 connects the arcuate portions 34. In this embodiment, the center plate member 33 comprises a surface plate member 36 in which a slot 37 is formed. The bearing members 15, which are secured to the body of the vehicle, are slidingly arranged in the slots 37 and slidingly bear on the bottom portions 38 thereof. The bottom portions 38 in turn slidingly bear on the upper surface 39 of the truck side frames 3. The sliding bearing members 15 restrain rotation of the bearing plate 33 with respect to the body and thus the arcuate portions 34 of the center plate member 33 cooperating with the bearing portions 11 form a centerless center bearing for the truck providing for its relative rotation with respect to the body. The sliding bearing members 15 are however able to slide laterally in the slots 37 to provide for lateral displacement of the truck with respect to the body. Springs 27 are provided to restrain this lateral movement, each having one end engaging a bracket 28 on the center plate member 33 and its other end engaging the sliding bearing member 15. Oil dams 32 are provided to retain oil on the sliding surfaces of the arcuate portion 34 of the center plate member 33. Since the sliding bearing members 15 rest on the center plate member 33 which in turn transmits the body weight to the side frames 3, no supplemental means are required to hold the center plate member in position.

It will now be readily apparent that this invention permits the motorization of the middle axle of a three axle truck while providing a laterally displaceable construction since ample space for the motor is provided and the motor is readily accessible for maintenance, etc. While three axle trucks are shown in the drawing, it will be readily understood that the improved laterally displaceable truck construction of the invention is equally applicable to other axle combinations such as two or four axle trucks.

While we have illustrated and described specific embodiments of this invention, further modifications and improvements will occur to those skilled in the art. We desire it to be understood, therefore, that this invention is not limited to the specific embodiments shown and we intend in the appended claims to cover all modifications which do not depart from the spirit and scope of this invention.

What we claim as new and desire to secure by Letters Patent of the United States is:

1. In a rail vehicle having a body, a truck having a pair of side frames, bearing portions on said side frames, a center plate member having portions arranged in sliding engagement with said bearing portions forming a center bearing for said truck, means for carrying the weight of said body on said side frames, means for restraining horizontal rotation and for permitting lateral movement of said center plate member with respect to said body whereby said truck may both rotate with respect to and be displaced laterally of said body, and resilient means for restraining said lateral motion of said center plate member.

2. In a rail vehicle having a body, a truck having a pair of side frames, bearing portions on said side frames, a center plate member having portions arranged in sliding engagement with said bearing portions forming a center bearing for said truck, means on said body bearing on said side frames for carrying the weight of said body thereon, means on said center plate member for restraining horizontal rotation and for permitting lateral movement of said center plate member with respect to said body whereby said truck may both rotate with respect to and be displaced laterally of said body, and resilient means for restraining said lateral motion of said center plate member.

3. In a rail vehicle having a body, a truck having a pair of side frames, bearing portions on said side frames, a center plate member having portions arranged in sliding engagement with said bearing portions forming a center bearing for said truck, means on said body for carrying the weight of said body on said side frames, means on said center plate member including a guide for said last-mentioned means for restraining horizontal rotation and for permitting lateral movement of said center plate member with respect to said body whereby said truck may both rotate with respect to and be displaced laterally of said body, and resilient means for restraining said lateral motion of said center plate member.

4. In a rail vehicle having a body, a truck having a pair of side frames, bearing portions on said side frames, a center plate member having portions arranged in sliding engagement with said bearing portions forming a center bearing for said truck, bearing members on said body bearing on said side frames for carrying the weight of said body thereon, guides on said center plate member cooperating with said bearing members for restraining horizontal rotation and for permitting lateral movement of said center plate member with respect to said body whereby said truck may both rotate with respect to and be displaced laterally of said body, and resilient means for restraining said lateral motion of said center plate member.

5. In a rail vehicle having a body, a truck having a pair of side frames, arcuate bearing portions on said side frames, a center plate member having portions arranged in sliding engagement with said arcuate bearing portions forming a center bearing for said truck, bearing members on said body for carrying the weight of said body on said side frames, guides on said center plate member cooperating with said bearing members for restraining horizontal rotation and for permitting lateral movement of said center plate member with respect to said body whereby said truck may both rotate with respect to and be displaced laterally of said body, and resilient means for restraining said lateral motion of said center plate member.

6. In a rail vehicle having a body, a truck having a pair of side frames, each of said side frames having an arcuate bearing portion formed thereon, a center plate member having portions respectively arranged in sliding engagement with said side frame bearing portions forming a center bearing for said truck whereby said truck may rotate relative to said body, such center plate member having a pair of guiding openings formed therein respectively arranged over said side frames, a pair of sliding bearing members secured to said body and extending through said guiding openings, said bearing members slidingly bearing on said side frames for carrying the weight of said body thereon, said bearing members being adapted to slide laterally in said center plate member guiding openings for permitting lateral displacement of said truck with respect to said body, said bearing members prevent rotation of said center plate member with respect to said body, and resilient means for restraining said lateral movement of said truck.

7. In a rail vehicle having a body, a truck having a pair of side frames, each of said side frames having an arcuate bearing portion formed thereon, said bearing portions having a common radius from a point along the center line of said truck, a center plate member having arcuate portions respectively arranged in sliding engagement with said side frame bearing portions forming a center bearing for said truck whereby said truck may rotate relative to said body, said center plate member having a central portion connecting said arcuate portions, said center plate member having a pair of guiding openings formed therein respectively arranged over said side frames, a pair of sliding bearing members secured to said body and extending through said guiding openings, said bearing members slidingly bearing on said side frames for carrying the weight of said body thereon, said bearing members being adapted to slide laterally in said guiding openings for permitting lateral displacement of said truck with respect to said body, said bearing members preventing rotation of said center plate member with respect to said body, and spring means having one portion engaging a member secured to said cab and another portion engaging said center plate member for restraining the lateral movement of said truck.

8. In a rail vehicle having a body, a truck having wheels and axles and having a pair of side frames supported by said axles, each of said side frames having an arcuate bearing portion formed thereon, said bearing portions having a common radius from a point along the center line of said truck, a center plate member having arcuate portions arranged in sliding engagement with said side frame bearing portions forming a center bearing for said truck whereby said truck may rotate with respect to said body, one of said axles being arranged under said center bearing, a traction motor arranged for driving said one axle, said center plate member having a central opening therein for providing access to said motor, said center plate member having a pair of guiding openings formed therein respectively arranged over said side frames, a pair of sliding bearing members secured to said body and extending through said guiding openings, said bearing members slidingly bearing on said side frames for carrying the weight of said body thereon, said bearing members being adapted to slide laterally in said guiding openings for permitting lateral displacement of said truck with respect to said body, said bearing members preventing rotation of said center plate member with respect to said body, and spring means having one portion engaging a member secured to said cab and another portion engaging said center plate member for restraining said lateral movement of said truck.

9. In a rail vehicle having a body, a truck having a pair of side frames, each of said side frames having an arcuate bearing portion formed thereon, said bearing portions having a common radius from a point along the center line of said truck, a center plate member having arcuate portions arranged in sliding engagement with said side frame bearing portions forming a center bearing for said truck whereby said truck may rotate with respect to said body, said center plate member having a central portion connecting said arcuate portions, said center plate member having a pair of guiding openings formed therein respectively arranged over said side frames, a pair of sliding bearing members secured to said body and extending through said guiding openings, said bearing members slidingly bearing on said side frames for carrying the weight of said body thereon, said bearing members being adapted to slide laterally in said guiding openings for permitting lateral displacement of said truck with respect to said body, said bearing members preventing rotation of said center plate member with respect to said body, and a pair of springs each having one portion engaging one of said bearing members and another portion engaging said center plate member for restraining said lateral movement of said truck.

10. In a rail vehicle having a body, a truck having wheels and axles and having a pair of side frames supported by said axles, each of said side frames having an arcuate bearing portion formed thereon, said bearing portions having a common radius from a point along the center line of said truck, transoms respectively connecting said side frames on either side of said bearing portions, a center plate member having arcuate portions arranged in sliding engagement with said bearing portions forming a center bearing for said truck whereby said truck may rotate with respect to said body, said center plate member having a central portion connecting said arcuate portions, one of said axles being arranged under said center bearing, a traction motor arranged for driving said one axle, said central portion of said center plate member being spaced from said transoms permitting access to said motor, said center plate member having a pair of guiding openings formed therein respectively arranged over said side frames, a pair of sliding bearing members secured to said body and extending through said guiding openings, said bearing members slidingly bearing on said side frame for carrying the weight of said body thereon, said bearing members being adapted to slide laterally in said guiding openings for permitting lateral displacement of said truck with respect to said body, said bearing member preventing rotation of said center plate member with respect to said body, and spring means having one portion engaging a member secured to said body and another portion engaging said center plate member for restraining said lateral movement of said truck.

11. In a rail vehicle having a body, a truck having a pair of side frames, each of said side frames having an arcuate bearing portion formed thereon, a center plate member having portions arranged in sliding engagement with said side frame bearing portions forming a center bearing for said truck whereby said truck may rotate with respect to said body, said center plate member having a pair of guiding portions formed therein respectively arranged over said side frames, and a pair of sliding bearing members secured to said body and arranged in said guiding portion for carrying the weight of said body on said side frames, said bearing members being adapted to slide laterally in said guiding portions for permitting lateral displacement of said truck with respect to said body, said bearing members preventing rotation of said center plate member with respect to said body.

12. In a rail vehicle having a body, a truck having wheels and axles and having a pair of side frames supported by said axles, each of said side frames having an arcuate bearing portion formed thereon, said bearing portions having a common radius from a point along the center line of said truck, a center plate member having arcuate portions arranged in sliding engagement with said side frame bearing portions forming a center bearing for said body whereby said truck may rotate with respect to said body, one of said axles being arranged under said center bearing, a traction motor arranged for driving said axle, said center plate member having a central opening formed therein for providing access to said motor, said center plate member having a pair of guiding openings formed therein respectively arranged over said side frames, a pair of sliding bearing members secured to said body and extending through said guiding openings, said bearing members slidingly bearing on said side frames for carrying the weight of said body thereon, said bearing members being adapted to slide laterally in said guiding openings for permitting lateral displacement of said truck with respect to said body, said bearing members preventing rotation of said center plate member with respect to said body.

13. In a rail vehicle having a body, a truck having wheels and axles and having a pair of side frames supported by said axles, each of said side frames having an arcuate bearing portion formed therein, said bearing portions having a common radius from a point along the center line of said truck, transoms respectively connecting said side frames on either side of said bearing portions, a center plate member having arcuate portions arranged in sliding engagement with said side frame bearing portions forming a center bearing for said truck whereby said truck may rotate with respect to said body, said center plate member having a center portion connecting said arcuate portions, one of said axles being arranged under said center bearing, a traction motor arranged for driving said axle, said central portion of said center plate member being spaced from said transoms permitting access to said motor, said center plate member having a pair of guiding openings formed therein respectively arranged over said side frames, a pair of sliding bearing members secured to said body and extending through said guiding openings, said bearing members slidingly bearing on said side frames for carrying the weight of said body thereon, said bearing members being adapted to slide laterally in said guiding openings for permitting lateral displacement of said truck with respect to said body, said bearing members preventing rotation of said center plate member with respect to said body.

14. In a rail vehicle having a body, a truck having a pair of side frames, each of said side frames having an arcuate bearing portion formed thereon, a center plate member having portions arranged in sliding engagement with said side frame bearing portions forming a center bearing for said truck whereby said truck may rotate with respect to said body, sliding bearing members secured to said body for carrying the weight of said body on said side frames, said center plate member having guiding means thereon for permitting said center plate member to slide laterally with respect to said bearing members whereby said truck may be displaced laterally with respect to said body, said guiding means cooperating with said bearing members to prevent rotation of said center plate member with respect to said body, and resilient means for restraining said lateral motion of said center plate member.

15. In a rail vehicle having a body, a truck having a pair of side frames, each of said side frames having an arcuate bearing portion formed thereon, a center plate member having portions arranged in sliding engagement with said side frame bearing portions forming a center bearing for said truck whereby said truck may rotate with respect to said body, sliding bearing members secured to said body for carrying the weight of said body on said side frames, said center plate member having guiding means thereon for permitting said center plate member to slide laterally with respect to said bearing members whereby said truck may be displaced laterally with respect to said body, said guiding means cooperating with said bearing members to prevent rotation of said center plate member with respect to said body, and means for retaining lubricant on the sliding surfaces of said center plate member.

16. In a rail vehicle having a body, a truck having a pair of side frames, each of said frames having an arcuate bearing portion formed thereon, a center plate member having portions arranged in sliding engagement with said side frames bearing portions forming a center bearing for said truck whereby said truck may rotate with respect to said body, said center plate member having guiding slots formed therein arranged over said side frames, sliding bearing members secured to said body and arranged in said slots, said bearing members slidingly bearing on the bottom portions of said slots whereby the weight of said body is transmitted to said side frames, said bearing members being adapted to slide laterally in said guiding slots for permitting lateral displacement of the said truck with respect to said body, said bearing members cooperating with said guiding slots to prevent rotation of said center plate member with respect to said body, and resilient means for restraining said lateral movement of said bearing members.

17. In a rail vehicle having a body, a truck having a pair of side frames, each of said side frames having an arcuate bearing portion formed thereon, said bearing portions having a common radius from a point along the center line of said truck, a center plate member having arcuate portions arranged in sliding engagement with said side frame bearing portions forming a center bearing for said truck whereby said truck may rotate with respect to said body, said center plate member having a pair of guiding slots formed therein respectively arranged over said side frames, a pair of sliding bearing members secured to said body and arranged in said guiding slots, said bearing members slidingly bearing on the bottom portions of said slots whereby the weight of said body is transmitted to said side frames, said bearing members being adapted to slide laterally in said guiding slots for permitting lateral displacement of said truck with respect to said body, said bearing members cooperating with said guiding slots to prevent rotation of said center plate member with respect to said body, and a pair of springs each having one portion engaging one of said bearing members and another portion engaging said center plate member for restraining said lateral movement of said bearing members.

18. In a rail vehicle having a body, a truck having wheels and axles and having a pair of side frames supported by said axles, each of said side frames having arcuate bearing portions formed thereon, a center plate member having arcuate portions arranged in sliding engagement with said bearing portions forming a center bearing for said truck whereby said truck may rotate with respect to said body, one of said axles being arranged under said center bearing and adapted to be driven by a traction motor, said center plate member having a central opening formed therein for providing access to said motor, bearing members secured to said body for carrying the weight of said body on said side frames, said center plate member having guiding means formed thereon for permitting said bearing members to slide laterally with respect to said center plate member whereby said truck may be displaced laterally with respect to said body, said bearing members cooperating with said guiding means to prevent rotation of said center plate member with respect to said body, and resilient means for restraining said lateral motion of said bearing members.

BASIL S. CAIN.
JOHN K. ERZER.

References Cited in the file of this patent

UNITED STATES PATENTS

| Number | Name | Date |
| --- | --- | --- |
| 2,014,970 | Kjolseth | Sept. 17, 1935 |
| 2,271,867 | Maris | Feb. 3, 1942 |
| 2,610,585 | Brecht | Sept. 16, 1952 |

FOREIGN PATENTS

| Number | Country | Date |
| --- | --- | --- |
| 52,781 | Denmark | Mar. 8, 1937 |
| 784,969 | France | July 30, 1935 |
| 825,549 | France | Mar. 4, 1938 |